(12) United States Patent
Sato

(10) Patent No.: US 7,782,204 B2
(45) Date of Patent: Aug. 24, 2010

(54) WIRELESS IC TAG WITH COUNTER, AND INFORMATION MANAGEMENT SYSTEM

(75) Inventor: Tadashi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 647 days.

(21) Appl. No.: 11/730,382

(22) Filed: Mar. 30, 2007

(65) Prior Publication Data

US 2007/0241865 A1 Oct. 18, 2007

(30) Foreign Application Priority Data

Mar. 31, 2006 (JP) .............................. 2006-098485

(51) Int. Cl.
*G08B 13/14* (2006.01)
(52) U.S. Cl. .................................................. 340/572.1
(58) Field of Classification Search ............. 340/572.1, 340/10.5, 10.1, 10.51, 636.19
See application file for complete search history.

(56) References Cited

U.S. PATENT DOCUMENTS

2006/0245248 A1* 11/2006 Hu ......................... 365/185.09
2006/0265181 A1* 11/2006 Stewart ....................... 702/178

FOREIGN PATENT DOCUMENTS

| JP | 10-224278   | 8/1998 |
| JP | 2001-256459 | 9/2001 |
| JP | 2005-235180 | 9/2005 |

* cited by examiner

*Primary Examiner*—Phung Nguyen
(74) *Attorney, Agent, or Firm*—McGinn IP Law Group PLLC

(57) ABSTRACT

The wireless IC tag has a counter for counting on the basis of a signal received via the antenna or for counting in cases where a signal transmits via the antenna. The wireless IC tag may have a counter for each required data field and incrementing/decrementing a count value when data is read from the data field. The wireless IC tag may have a counter for each byte field in a memory and incrementing/decrementing a count value when data is read from the byte field.

18 Claims, 10 Drawing Sheets

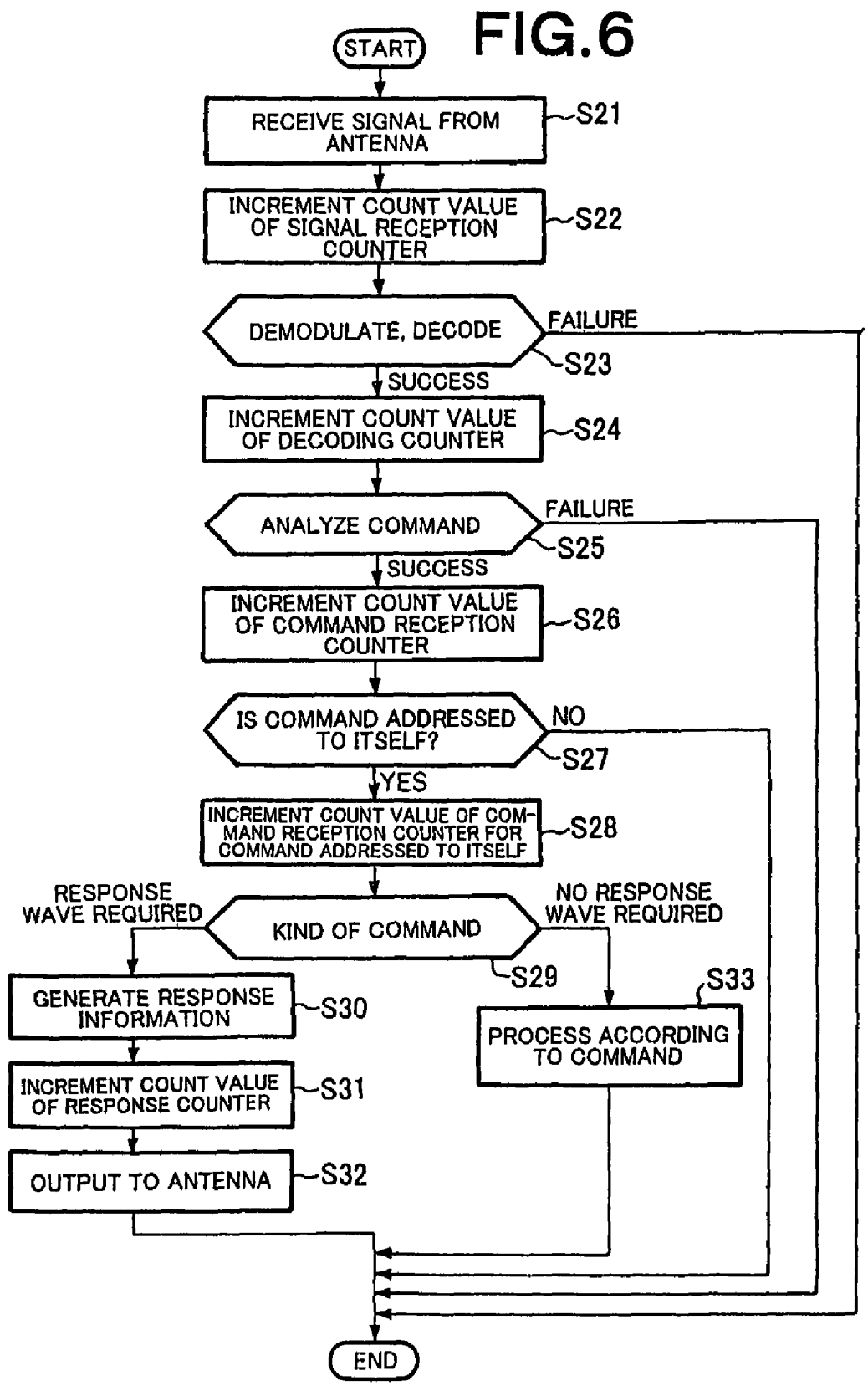

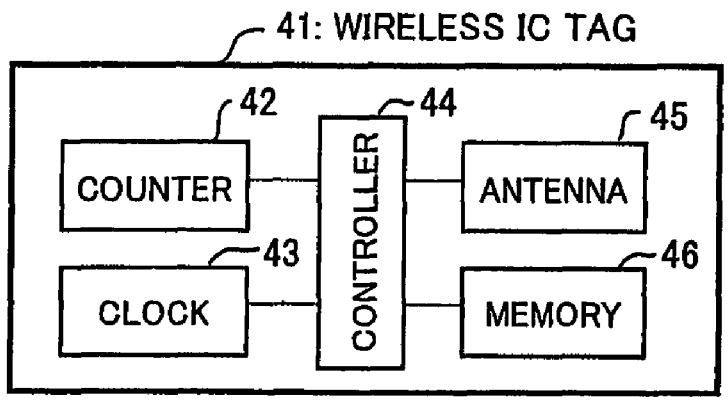
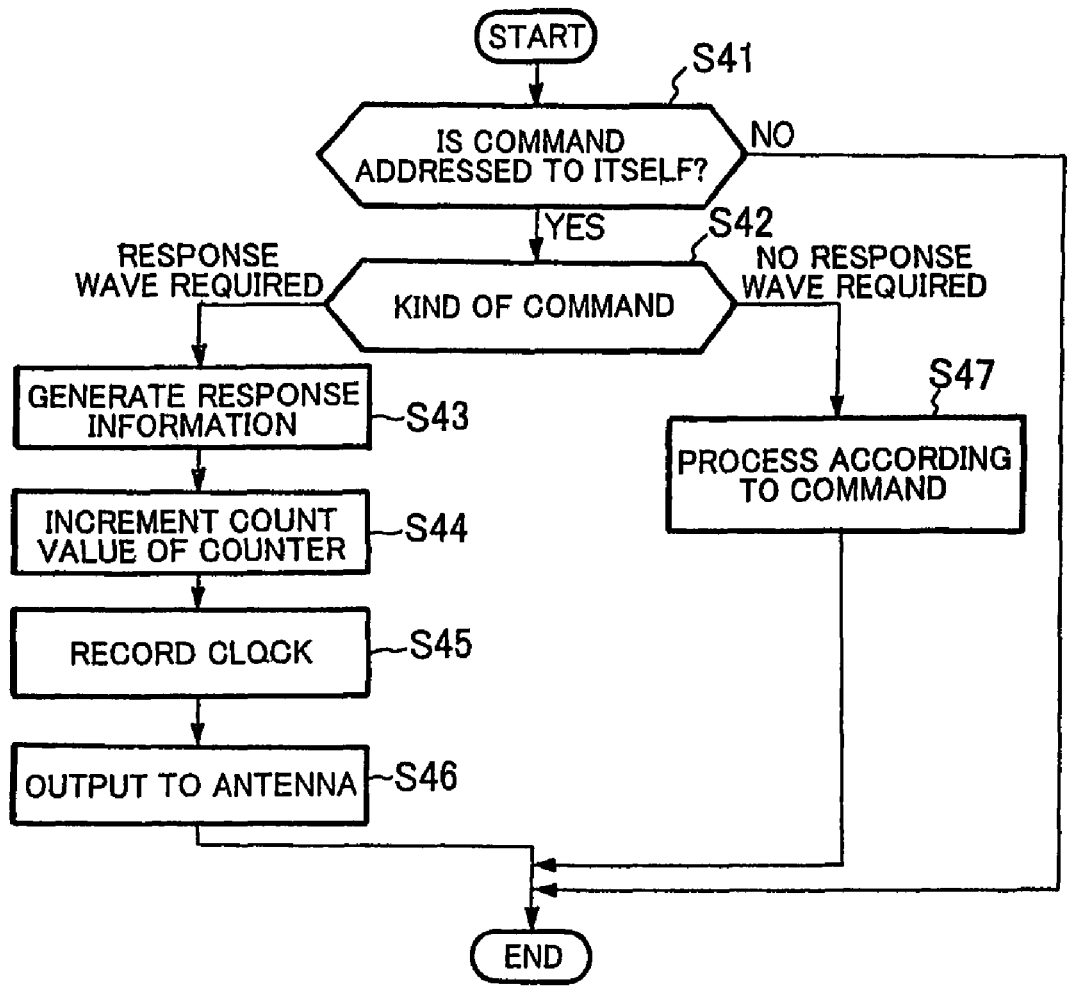

WIRELESS IC TAG WITH COUNTER, AND INFORMATION MANAGEMENT SYSTEM

BACKGROUND OF THE INVENTION

1. Field of the Invention

The present invention relates to a wireless IC tag and an information management system and particularly, to a wireless IC tag including a counter, and an information management system including both of the wireless IC tag and a wireless IC tag reader/writer (reading and writing apparatus). The wireless IC tag may be called as a IC tag, an electronic tag, Radio Frequency Identification (RFID) tag, or Radio Frequency Identification (RFID).

2. Description of the Related Art

Japanese Non-examined Patent Application (JP-A) No. 2001-256459 discloses a wireless IC tag with a memory, and IC tag reader/writer with a communication control unit that counts down from the number of usable times each time memory data is updated.

JP-A No. 2005-235180 discloses a technique of counting the number of update success times between a reader and a tag by the reader and holding the number of update success times in a memory in the reader.

In the technique of JP-A No. 2001-256459, the life of the wireless IC tag which ends due to exhaustion of a power source provided in the wireless IC tag has to be estimated prior to the use of the wireless IC tag. The power source is also consumed by reading of data, transmission of a response wave, and the like, so that it is insufficient to count only the number of update times of the memory.

In the technique of JP-A No. 2005-235180, the cause of the case where the reader does not receive a response from a wireless IC tag cannot be identified. For example, if the cause is that the wireless IC tag does not receive an interrogation wave (an inquiry wave), it cannot be identified by the technique of JP-A No. 2005-235180.

SUMMARY OF THE INVENTION

An object of the present invention is to provide a wireless IC tag and an information management system, when a reader/writer fails to obtain information to/from a wireless IC tag, capable of identifying the cause of the failure. More particularly, an object of the invention is to provide a wireless IC tag and an information management system capable of identifying the cause on the basis of the behavior of the wireless IC tag.

Another object of the invention is to provide a wireless IC tag and an information management system capable of estimating the remaining life of the tag in the case of transmitting electric waves, writing data, and sensing the external environment by using its built-in power source.

Further another object of the invention is to provide a wireless IC tag and an information management system capable of detecting an operation such as an expected reading or writing operation on the wireless IC tag.

According to a first aspect of the present invention, there is provided a wireless IC tag including an antenna, and a counter for counting on the basis of a signal received via the antenna.

According to a second aspect of the present invention, there is provided a wireless IC tag including an antenna, and a counter for counting in cases where a signal transmits via the antenna. The counter for counting in cases where a signal transmits via the antenna is any one of a counter for counting before outputting a signal to the antenna, a counter for counting at same time that a signal outputs to the antenna, and a counter for counting after outputting a signal to the antenna.

According to a third aspect of the present invention, there is provided a wireless IC tag including a memory for holding data, and a counter for each required data region of said memory or for at least one byte region of said memory, wherein said counter counts when data are read or written from or to the data region or when data are read or written from or to at least one byte region.

According to a fourth aspect of the present invention, there is provided a wireless IC tag including a built-in power source and a counter for counting the number of actions periodically taken by said wireless IC tag.

An information management system of the invention includes any one of the above-described wireless IC tags, and a wireless IC tag reader/writer for reading and writing information from and to the wireless IC tag.

BRIEF DESCRIPTION OF THE DRAWINGS

FIG. 6 is a flowchart showing operations of the wireless IC tag of the third embodiment of the invention;

FIG. 7 is a block diagram showing a wireless IC tag with a counter of a fourth embodiment of the invention;

FIG. 8 is a flowchart showing operations of the wireless IC tag of the fourth embodiment of the invention;

DESCRIPTION OF THE PREFERRED EMBODIMENTS

Embodiments of the present invention will be described in detail hereinbelow with reference to the drawings.

First Embodiment

Figure 1:
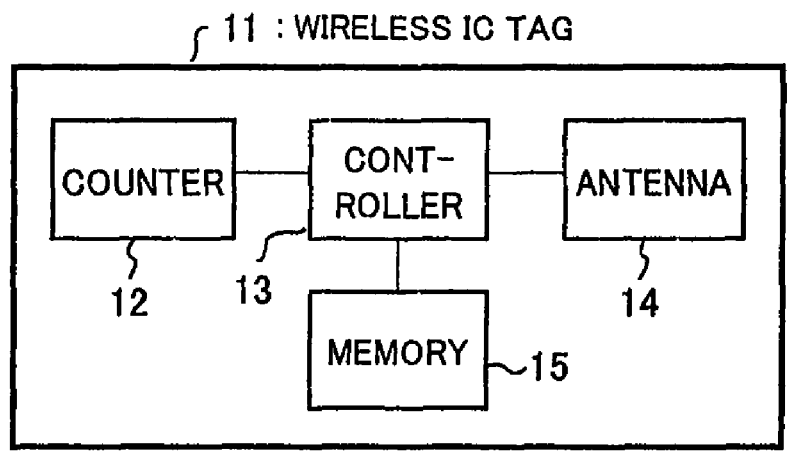
FIG. 1 is a block diagram showing a wireless IC tag with a counter of a first embodiment of the present invention.

The configuration of a first embodiment of the present invention will be described below. FIG. 1 is a block diagram showing a wireless IC tag with a counter.

As shown in FIG. 1, a wireless IC tag 11 includes an antenna 14, a controller 13, a counter 12, and a memory 15. The counter 12 has a memory for holding a count value.

The controller 13 demodulates and decodes a signal received via the antenna 14, analyzes a command, reads data from the memory 15, writes data to the memory 15, generates data to be transmitted, codes and modulates the generated data, outputs a response signal (wave) to the antenna 14 and, in addition, increments the count value of the counter 12.

An electric wave or electromagnetic wave is transmitted and received via the antenna 14 by the controller 13.

The counter 12 increments the count value before the wireless IC tag 11 transmits a response wave, so that whether the wireless IC tag 11 transmits the response wave or not can be known. The count value is the value recorded in the memory of the counter 12.

The operation of the embodiment will be described below.

Figure 2:
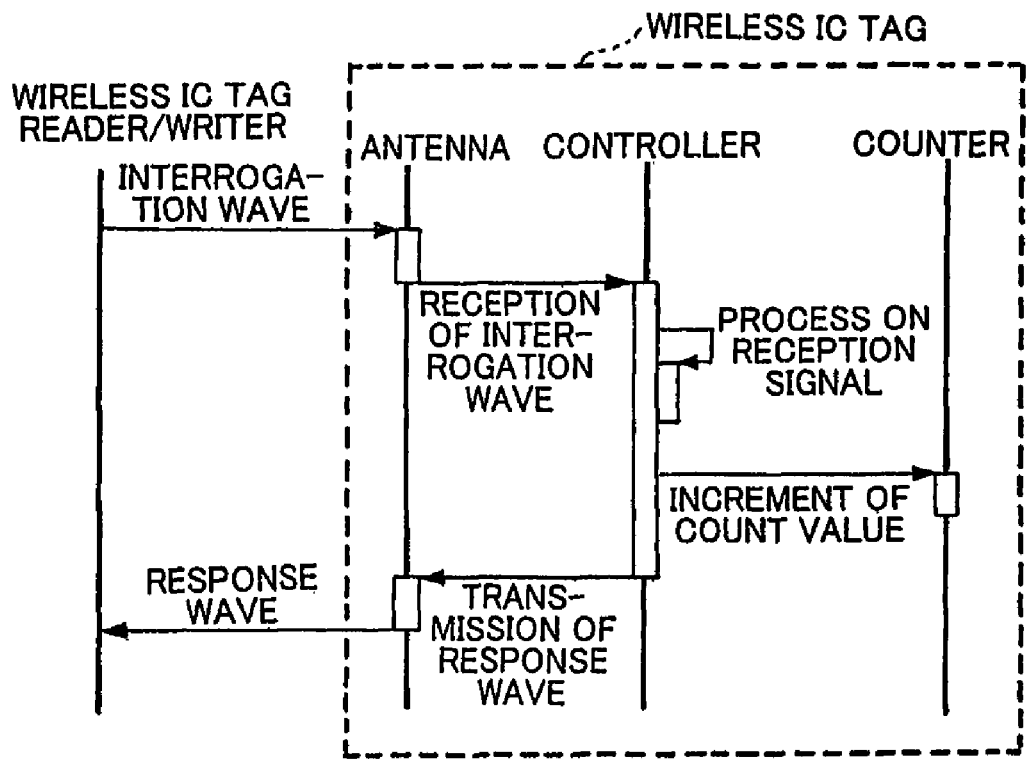
FIG. 2 is a diagram showing the operations from reception of an interrogation wave (an inquiry wave) by the wireless IC tag to transmission of a response wave by the wireless IC tag.
Figure 15:
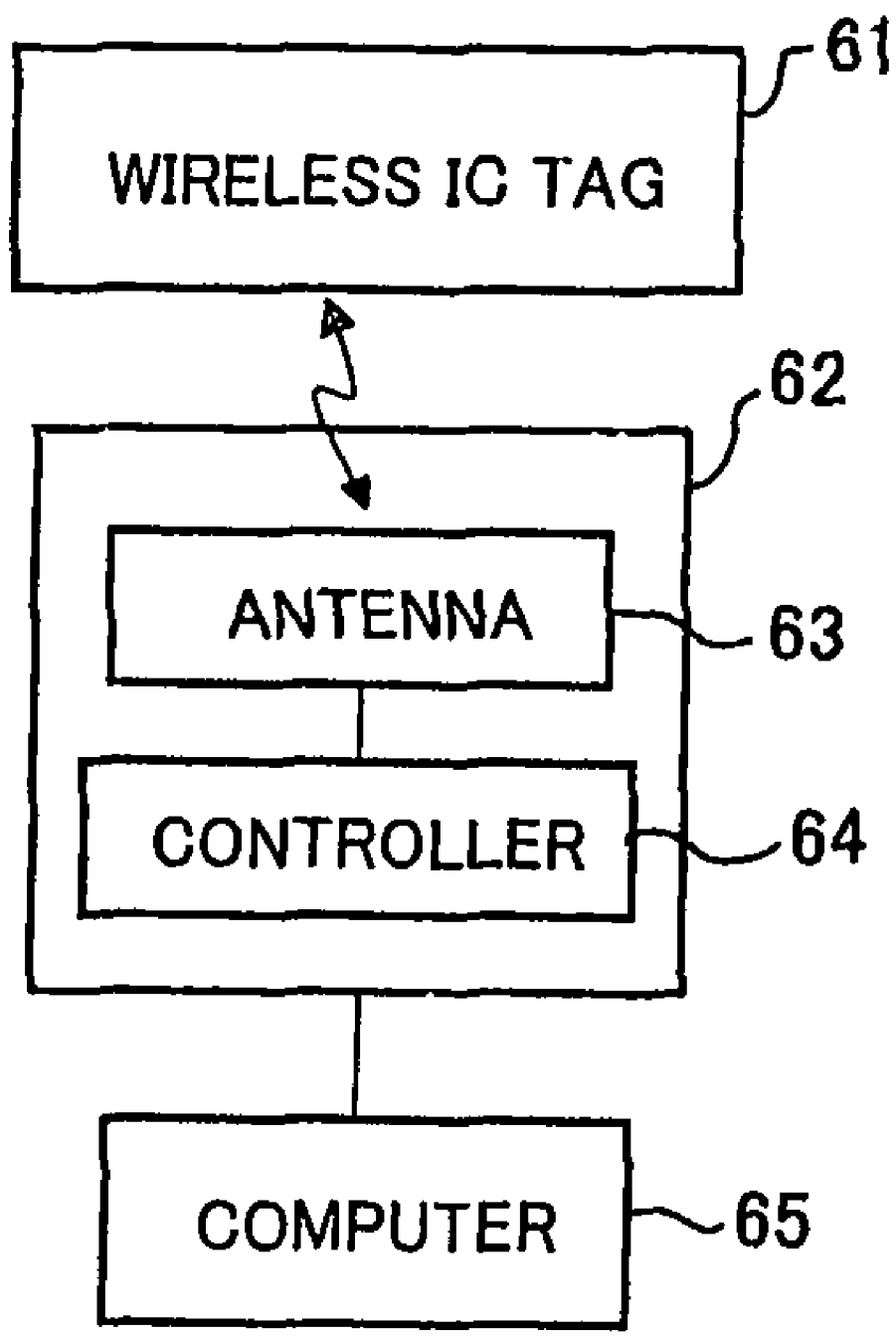
FIG. 15 is a block diagram showing an information management system of an embodiment of the present invention.

FIG. 2 shows the operations from reception of an interrogation wave (an inquiry wave) by the wireless IC tag to transmission of a response wave by the wireless IC tag. FIG. 15 is a block diagram showing an information management system. As shown in FIG. 15, an information management system 62 includes a wireless IC tag 61 and a wireless IC tag reader/writer (hereinbelow, reader/writer) 62. The reader/writer 62 includes an antenna 63 and a controller 64, transmits the interrogation wave (inquiry wave) to the wireless IC tag 61 and receives the response wave from the wireless IC tag 61. The information management system may include data processing equipment such as a computer 65 connected with the reader/writer 62.

When the wireless IC tag 11 receives the interrogation wave via the antenna 14 from the reader/writer, the signal of the interrogation wave is sent to the controller 13. The controller 13 demodulates and decodes the signal and analyzes a command. When the command requires a response, as necessary, the ID and memory data is read and processed as necessary. After that, the data is coded and modulated. The counter 12 increments the count value before the response signal is output to the antenna 14 and, after that, a response wave is transmitted to the reader/writer via the antenna 14. The counter 12 may increment the count value at the same time that the response signal is output to the antenna 14 or after the response signal is output to the antenna 14.

Although the count value of the counter 12 in FIG. 1 is incremented in the embodiment, the count value may be decremented. The count value is recorded in the memory of the counter 12. The increment (increment vale) of the count is not limited to one but can be two, three or larger. Similarly, the decrement (decrement vale) of the count is not limited to one but can be two, three or larger. The increment (increment vale) or the decrement (decrement vale) can be stored in the memory 15. The controller 12 can increment the count value of the counter 12 on the basis of the increment, or the controller 12 can decrement the count value of the counter 12 on the basis of the decrement. The increment or the decrement can be determined in the process of manufacturing the wireless IC tag. The increment or the decrement is not limited to be fixed but can be dynamic. For example, the increment or the decrement can be set to x, 2x, or $x^2$ where "x" is a number stored in the memory 15. The increment or the decrement can be also determined based on an instruction from the reader/writer.

Although a representative example of the initial count value of the counter 12 in FIG. 1 is zero, the initial count value is not limited to zero.

Any one of the following methods can be used as the method of notifying the reader/writer of the count value of the counter 12.

(1) A method of including the count value in a response signal (2) A method of independently preparing a command for notifying of a count value and, when the command is received, notifying the reader/writer of the count value (3) A method of designating a location in a memory that holds the count value by a command designating the address in the memory and reading the count value However, the count value notifying methods are not limited to those methods.

Effects of the embodiment will now be described.

According to the first embodiment, in the case where the wireless IC tag has built-in battery for transmitting a response wave, the count value can be referred to for estimating the remaining life. In this case, the counter increments the count value every transmitting. In the case where the manufacturer of a wireless IC tag assures the number of response times, the user of the wireless IC tag can check whether the response wave is transmitted more than the assured number of times or not by referring to the count value.

In the case where the reader/writer fails to acquire information from the wireless IC tag, the cause of the failure can be identified. If the count value is incremented, it can be determined that although the wireless IC tag transmits the response wave, the reader/writer cannot receive the response wave. If the count value is not incremented, it can be determined that the wireless IC tag does not transmit the response wave. Therefore, the state between the wireless IC tag and the reader/writer can be investigated.

If the count value when the reader/writer reads from the wireless IC tag is larger than that of last time by more than one, it can be detected that another reader/writer reads between the two reading operations.

A wireless IC tag may be attached to a commodity or an exhibit and counts the number of times that the commodity or exhibit is referred to by the reader/writer. It can be considered that the larger the count value is, the more popular the commodity or exhibit is. Therefore, the wireless IC tag can be used as marketing research.

Second Embodiment

Figure 3:
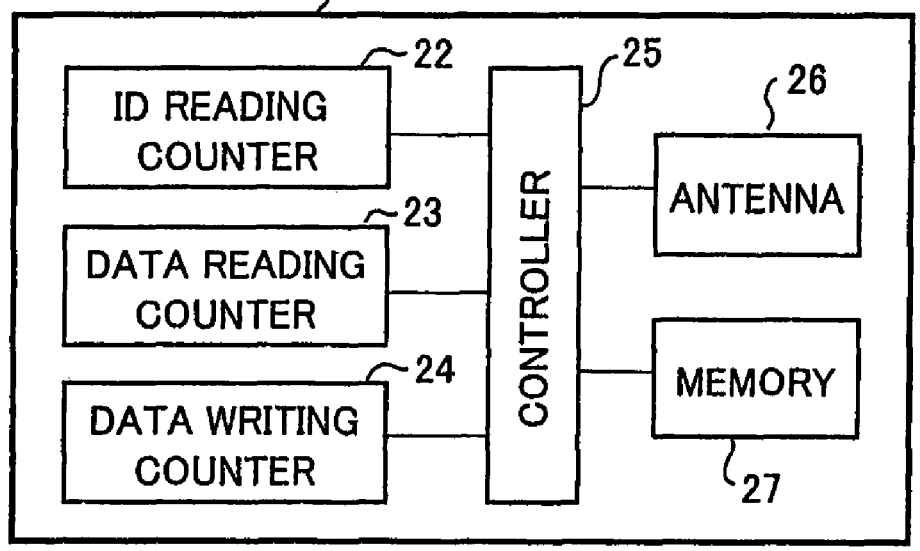
FIG. 3 is a block diagram showing a wireless IC tag with a counter of a second embodiment of the invention.

FIG. 3 is a block diagram showing the configuration of a second embodiment of the present invention. A wireless IC tag 21 includes an antenna 26, a controller 25, an ID read counter 22, a data read counter 23, a data write counter 24, and a memory 27. Each of the counters 22, 23, and 24 has a memory for holding a count value.

The operation of the second embodiment will be described below.

Figure 4:
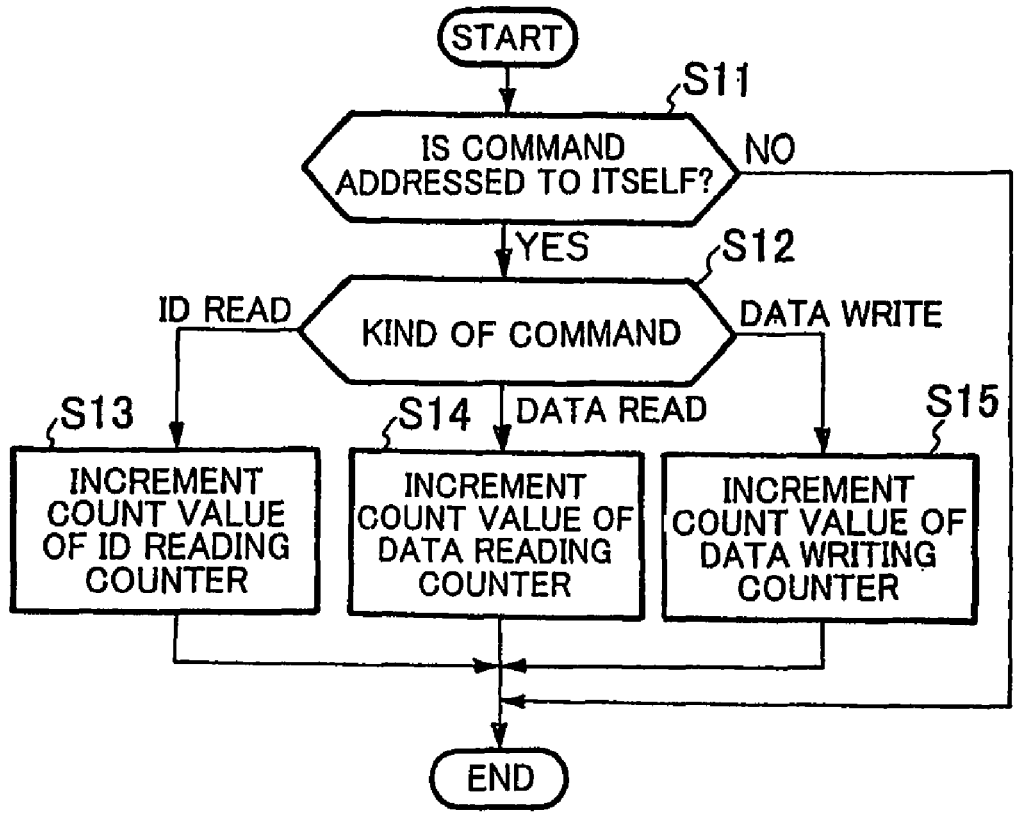
FIG. 4 is a flowchart showing operations of the wireless IC tag of the second embodiment of the invention.

FIG. 4 shows operations from analysis of the command received from a reader/writer to incrementation of the count values of one of the counters 22 to 24. Processes until the command is analyzed are similar to those of the first embodiment. After increment of the count values, the process specified by the command is performed. When the command requires a response, in a manner same as the first embodiment, a response wave is transmitted to the reader/writer.

As shown in FIG. 4, first, the controller 25 determines whether the command is to the wireless IC tag itself or not (step S11). If not, the operation is finished. Otherwise, go to next step and identify the type of the command (step S12). If the command is an ID (IDentification) read from the wireless IC tag, the count value of the ID read counter 22 is incremented (step S13). When the command is a data read from the memory 27 in the wireless IC tag, the count value of the data read counter 23 is incremented (step S14). When the command is data write to the memory 27 in the wireless IC tag, the count value of the data write counter 24 is incremented (step S15).

In FIG. 4, after the controller 25 determines whether the command is to the wireless IC tag itself or not (step S11), it identifies the type of the command (step S12). The operations can be performed in reverse order. That is, the step S11 can be executed after the step S12.

In the configuration shown in FIG. 3, the number of the types of the command is three (an ID read command, a data read command, and a data write command). However, the number is not limited to the three. The wireless IC tag can include counters for all of the commands which it can executes. Alternatively, the wireless IC tag may include one or more counters for part of commands which can be processed by the wireless IC tag (for example, only ID read counter, only data read counter, only data write counter, a combination of two counters out of the ID read counter, data read counter, and data write counter).

Although the count values of the counters 22, 23, and 24 in FIG. 3 are incremented, the count values may be decremented. The count values of the counters 22, 23, and 24 are recorded in the memory of the counters 22, 23, and 24, respectively. The increment (increment vale) of the count is not limited to one but can be two, three or larger. Similarly, the decrement (decrement vale) of the count is not limited to one but can be two, three or larger. The increment or the decrement can be stored in the memory 27. The controller 25 can increment the count values of the counters 22 to 24 on the basis of the increment, or the controller 25 can decrement the count values of the counters 22 to 24 on the basis of the decrement. The increment or the decrement can be determined in the process of manufacturing the wireless IC tag. The increment or the decrement is not limited to be fixed but can be dynamic. For example, the increment or the decrement can be set to x, 2x, $x^2$ where "x" is a number stored in the memory 27. The increment or the decrement can be also determined based on an instruction from the reader/writer. The increment or the decrement of the data write counter may be changed according to a write data amount. The increment or the decrement of the data read counter may be changed according to a read data amount. For example, when the write data amount or read data amount is below 4 bytes, the increment can be set to one. When the write data amount or read data amount is in the range from 4 bytes to 8 bytes, the increment can be set to two. When the write data amount or read data amount exceeds 8 bytes, the increment can be set to three.

Although a representative example of the initial count value of each of the counters in FIG. 3 is zero, the initial count value is not limited to zero.

The counter 23 of FIG. 3 may be set as one of the following counters.

A data read counter for each required data field in a memory

A data read counter for each byte field in a memory

The counter 24 of FIG. 3 may be set as one of the following counters.

A write counter for each required data field in a memory

A write counter for each byte field in a memory

Figure 11:
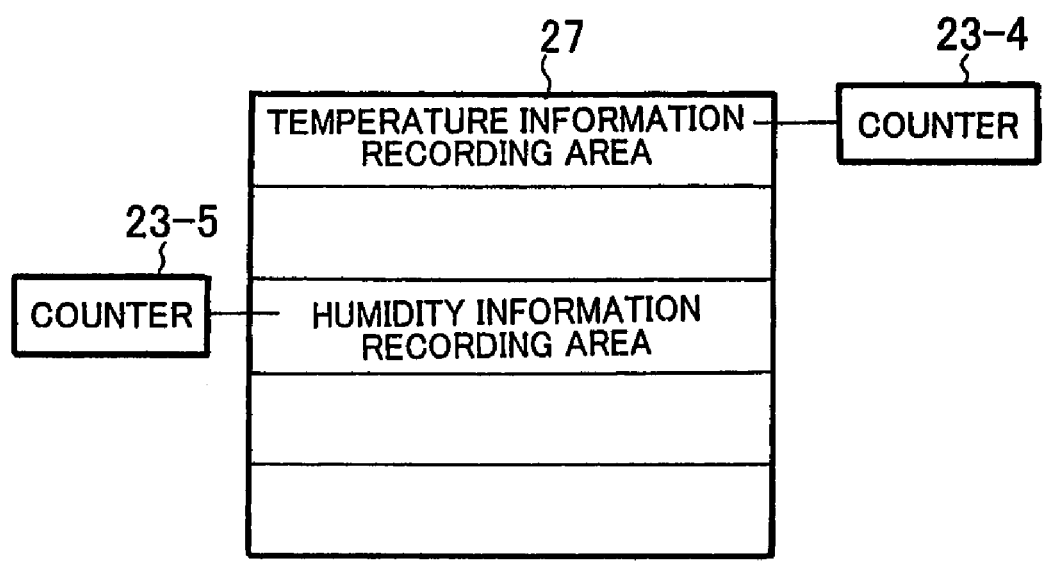
FIG. 11 is a diagram showing another example of the wireless IC tag with the counter of the second embodiment of the invention.

For example, as shown in FIG. 11, in the case where there are a data field in which temperature information is stored (a temperature information field as a required data field) and a data field in which humidity information is stored (humidity information field as a required data field) in the memory 27, data read counters 23-4 and 23-5 may be provided for the data fields and the number of times of reading/writing data from/to the data fields can be counted. Data write counters may be provided for the data fields, instead of the data read counters or with the data read counters. Temperature/humidity may be observed by build-in sensors and written to the memory 27 by the reader/writer. Written data is not limited to the temperature and humidity.

Figure 12:
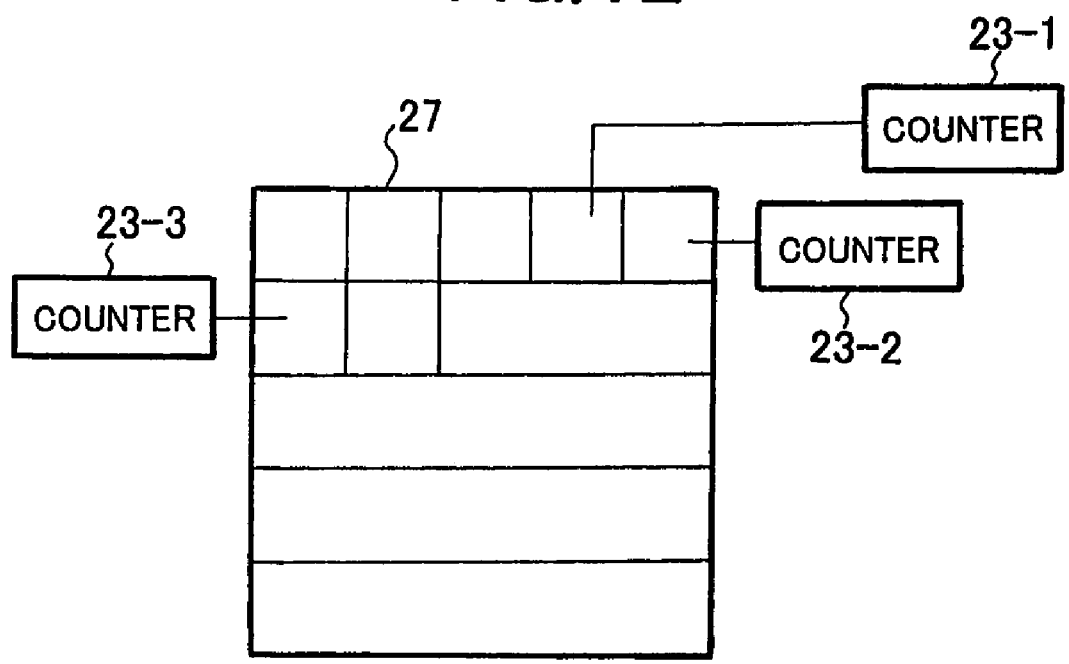
FIG. 12 is a diagram showing another example of the wireless IC tag with the counter of the second embodiment of the invention.

As shown in FIG. 12, data read counters 23-1 and 23-2 may be provided for two byte fields in the memory 27 respectively, and the number of times of reading/writing data from/to the byte regions can be counted. A counter 23-3 may be provided for a plurality of byte regions. A data write counter may be provided for one or more byte fields, instead of the data read counter or with the data read counter.

Effects of the second embodiment will now be described.

According to the second embodiment, by determining the increment size in accordance with power consumption amounts of the various commands, as compared with the first embodiment, the life of a wireless IC tag can be estimated more accurately.

Third Embodiment

Figure 5:
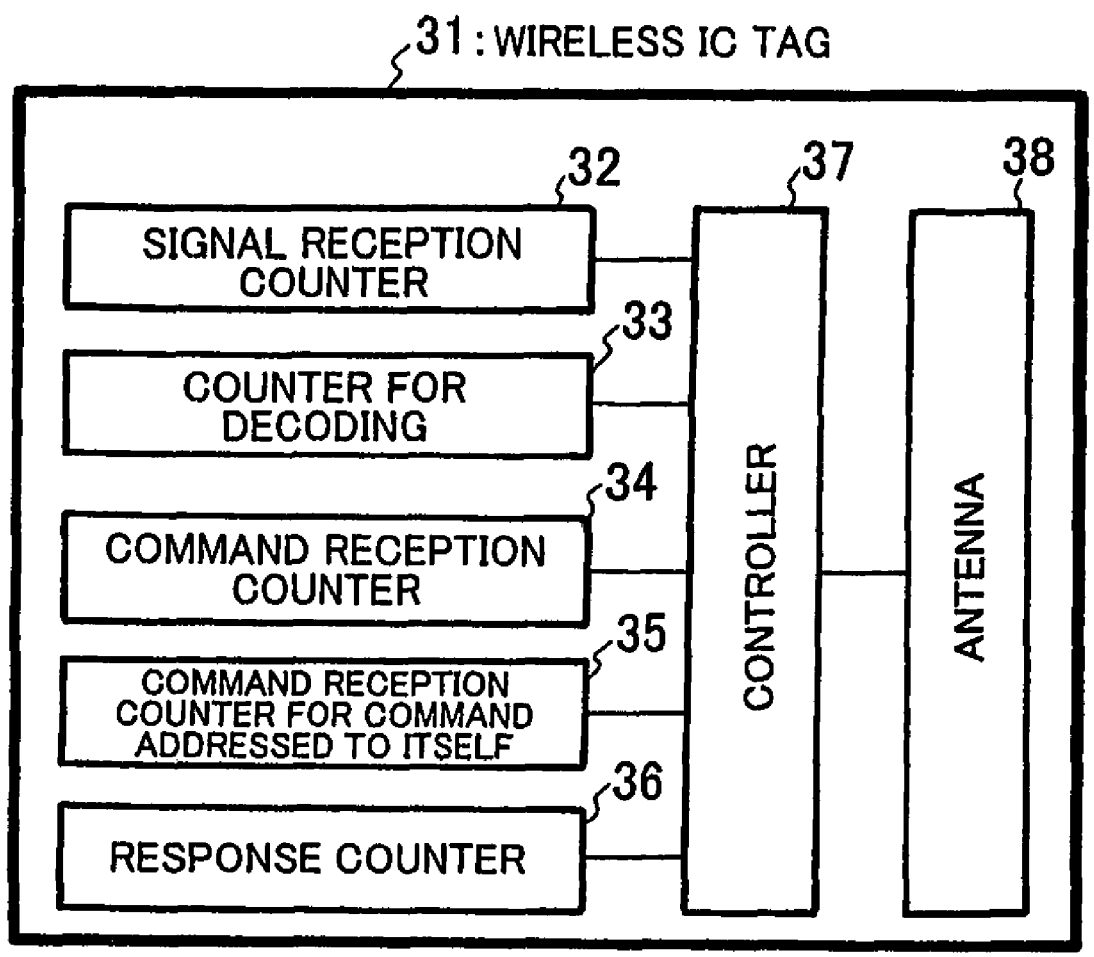
FIG. 5 is a block diagram showing a wireless IC tag with a counter of a third embodiment of the invention.

FIG. 5 is a block diagram showing the configuration of a third embodiment of the present invention. As shown in FIG. 5, a wireless IC tag 31 includes an antenna 38, a controller 37, a signal reception counter 32, a decode counter 33, a command reception counter 34, a command reception counter 35 for counting a command to the wireless IC tag 31 itself, and a response counter 36. Each of the counters 32 to 36 has a memory for holding a count value. The response counter 36 increments the count value before the response signal is output to the antenna 38 like the counter 12 in FIG. 1 of the first embodiment. One or more counters out of the signal reception counter 32, decoding counter 33, command reception counter 34, command reception counter 35, and response counter 36 may be provided in the present embodiment. The response counter 36 may increment the count value at the same time that the response signal is output to the antenna 38 or after the response signal is output to the antenna 38.

The operation of the third embodiment will be described below.

FIG. 6 shows the flow of processes from reception of a signal from the antenna 38 by the controller 37 to completion of operation on a reception command. When the controller 37 receives a signal from the antenna 38 (step S21), the count value of the signal reception counter 32 is incremented (step S22). After that, the controller 37 demodulates and decodes the signal (step S23). When the demodulation or decoding fails, the process is finished. When the demodulation and decoding succeed, the count value of the decoding counter 33 is incremented (step S24).

After the count value of the decoding counter 33 is incremented, the controller 37 analyzes a command (step S25). When the command analysis fails, the process is finished. When the command analysis succeeds (the received signal is recognized as a command), the count value of the command reception counter 34 is incremented (step S26). After the count value of the command reception counter 34 is incremented, the controller 37 determines whether the command is to the wireless IC tag 31 itself or not (step S27). If the command is not to the wireless IC tag 31 itself, the process is finished. If the command is to the wireless IC tag 31 itself, the count value of the command reception counter 35 is incremented (step S28). After that, the controller 37 identifies the type of the command (step S29). When the command requires a response wave, response information is generated (step S30), and the count value of the response counter 36 is incremented (step S31). After that, the controller 37 executes coding and demodulation, and the resultant signal is output to the antenna 38 (step S32). On the other hand, the command does not require a response wave, a process according to the command is performed (step S33) and the process is finished.

The wireless IC tag 31 shown in FIG. 5 may further include one or more of the following counters:

A demodulation counter for incrementing the count value when demodulation succeeds A code counter for incrementing the count value when coding succeeds A modulation counter for incrementing the count value when modulation succeeds One or more of the counters 22 to 24 shown in FIG. 3 of the second embodiment can be also combined with one or more of the counter counters 32 to 36.

Although the count values of the counters 32 to 36 in FIG. 5 are incremented, the count values can be decremented. The count values of the counters 32 to 36 are recorded in the memory of the counters 32 to 36, respectively. The increment (increment vale) of the count is not limited to one but can be two, three, or larger. Similarly, the decrement (decrement vale) of the count is not limited to one but can be two, three, or larger. The increment or the decrement can be stored in a memory. The controller 37 can increment the count values of the counters 32 to 36 on the basis of the increment, or the controller 37 can decrement the count values of the counters 32 to 36 on the basis of the decrement. The increment or the decrement can be determined in the process of manufacturing the wireless IC tag. The increment or the decrement is not limited to be fixed but can be dynamic. For example, the increment or the decrement can be set to x, 2x, $x^2$ where "x" is a number stored in the memory. The increment or the decrement can be also determined based on an instruction from a reader/writer.

Although a representative example of the initial count value of the counters in FIG. 5 is zero, the initial count value is not limited to zero.

Effects of the third embodiment will now be described.

According to the third embodiment, by referring to the values of the various counters, the performance characteristics of the wireless IC tag can be analyzed when the wireless IC tag reader attempts to read information of the wireless IC tag. For example, in the case that a response wave cannot be received in spite of attempts to read information from the wireless IC tag by the reader, the embodiment can be carried out. For example, if the count values of the signal reception counter 32 and the decode counter 33 are incremented and the count values of the other counters are not incremented, it can be analyzed that an interrogation wave cannot be recognized as a valid command.

If the count values of the signal reception counter 32, the decode counter 33, and the command reception counter 34 are incremented and the count values of the other counters are not incremented, it can be analyzed that a response wave is not transmitted because the command is not to the wireless IC tag. When many accesses are made from the reader/writer and the success rate of access is not 100%, the causes of failures can be statistically found by referring to the counters.

Fourth Embodiment

FIG. 7 is a block diagram showing the configuration of a fourth embodiment of the present invention. As shown in FIG. 7, a wireless IC tag 41 includes an antenna 45, a controller 44, a counter 42, a clock 43 and a memory 46. The counter 42 has a memory for holding a count value.

The operation of the fourth embodiment will be described below.

FIG. 8 shows the operations from reception of an interrogation wave (an inquiry wave) by the controller 44 to output of a response signal to the controller 44. The controller 44 determines whether the received command is to the wireless IC tag or not (step S41). If the received command is to the wireless IC tag, the type of the command is determined (step S42). When the command is to the wireless IC tag and requires a response wave, response data is generated (step S43). After that, the controller 44 increments the count value of the counter 42, and records the time monitored from the clock 43 at that time in the memory 46 (steps S44 and S45), and the response wave is transmitted from the antenna 45 (step S46). On the other hand, when the command does not require a response wave, the process according to the command is performed (step S47), and the process is finished.

The counter 42 in FIG. 7 can be replaced by one or more of the various counters described in the second, third, and fourth embodiments. In this case, if the count value of each of the counters is incremented, the time monitored from the clock 43 at that time is recorded in the memory 46.

The counter 42 may be not included in the wireless IC tag. When the counter is not provided, the number of times that time monitored from the clock 43 has recorded in the memory 46 is used as a count value. Although the count value of the counter 42 is incremented, it can be decremented as necessary.

Effects of the fourth embodiment will now be described.

According to the fourth embodiment, more detailed information can be obtained as compared with that in the second embodiment.

Fifth Embodiment

Figure 9:
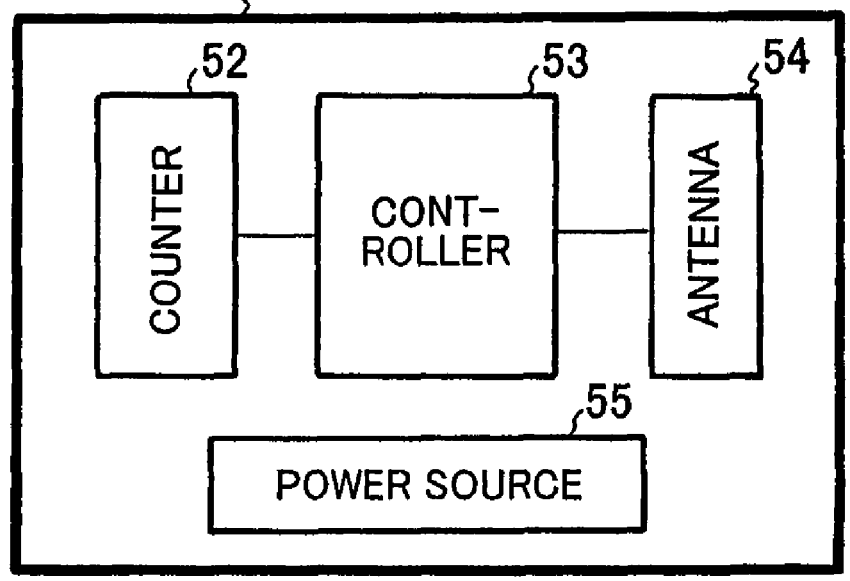
FIG. 9 is a block diagram showing a wireless IC tag with a counter of a fifth embodiment of the invention.

FIG. 9 is a block diagram showing the configuration of a fifth embodiment of the present invention. A wireless IC tag 51 includes an antenna 54, a controller 53, a counter 52, and a power source 55. The counter 52 has a memory for holding a count value. The antenna 54 is used only for transmitting an electric wave. The wireless IC tag of the embodiment transmits an electric wave by using the build-in power source in the wireless IC tag.

The operation of the fifth embodiment will be described below.

Figure 10:
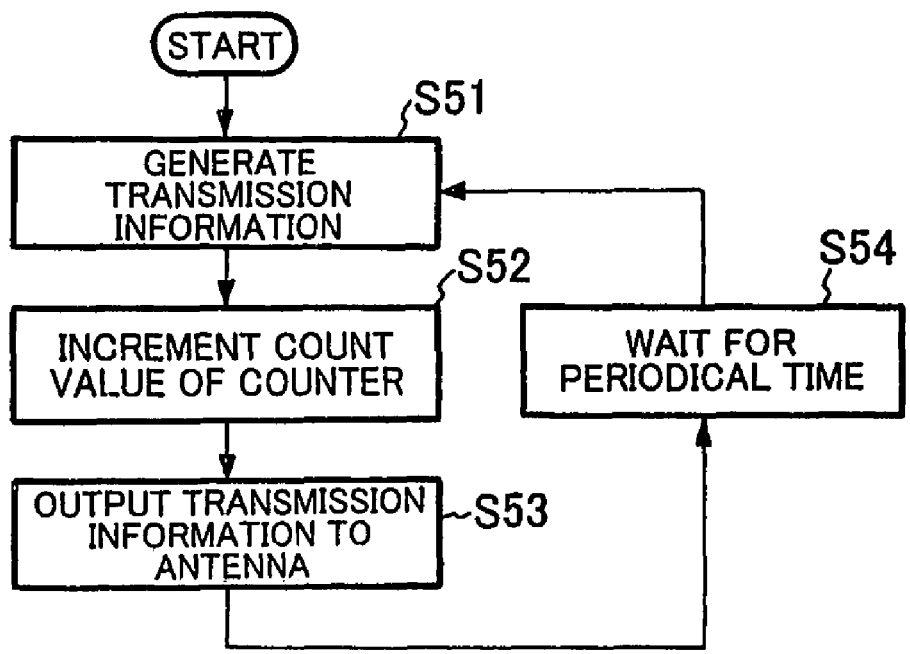
FIG. 10 is a flowchart showing operations of the wireless IC tag of the fifth embodiment of the invention.

FIG. 10 is a flowchart showing operations of the controller. The controller 53 generates transmission information data (step S51). After that, the count value of the counter 52 is incremented (step S52), and the transmission data is output to the antenna 54 (step S53). The controller waits for predetermined time (step S54) and generates a transmission data (step S51). The operations are repeated in predetermined cycles.

As the counter of FIG. 9, one or more of the counters shown in the first to fourth embodiments may be used. However, since the wireless IC tag does not receive an interrogation wave from a reader/writer, the demodulation counter, the decode counter 33, the command reception counter 34, the command reception counter 35 for counting a command to the wireless IC tag 31 can not be used.

In FIG. 10, although increment of the count value is triggered by periodical data outputs, the trigger is not limited to the periodical data output. Any action of a wireless IC tag can be a trigger. For example, the wireless IC tag may hold a counter where increment of the count value is triggered by sensing by the built-in sensor. A temperature sensor, a humidity sensor, a photodetector, or a pressure sensor can be used as the sensor. The detection signal when the sensing by the temperature sensor or humidity sensor is larger than a predetermined threshold level can be used as the trigger. The detection signal when the photodetector detects light irradiance can be used as the trigger, and the detection signal when the pressure sensor detects impact can be used as the trigger. Although the count value of the counter 52 is incremented, the count value may be decremented as necessary.

Although the representative example of the initial count value of the counter in FIG. 10 is zero, the initial count value is not limited to zero.

Effects of the fifth embodiment will now be described.

Also in the case of using a wireless IC tag with built-in battery, effects of the first to fourth embodiments can be obtained.

Sixth Embodiment

Figure 13:
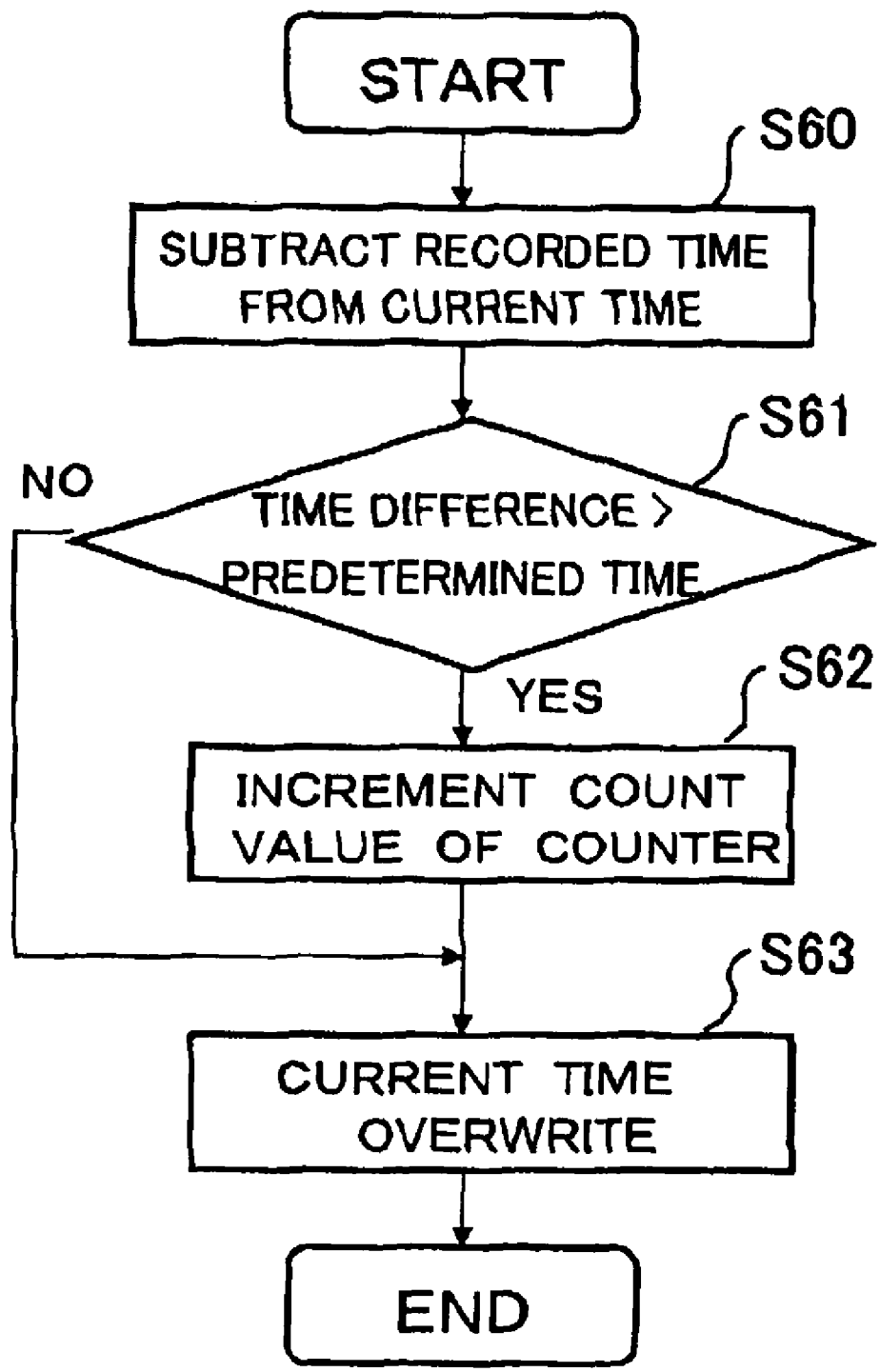
FIG. 13 is a flowchart showing operations of the wireless IC tag of the sixth embodiment of the invention.

FIG. 13 is a flowchart showing operations of the wireless IC tag of the sixth embodiment of the invention.

As shown in FIG. 13, when a controller receives a signal, the controller subtracts the time recorded in a memory from current time and determines whether time difference is longer than a predetermined amount of time or not (steps S60 and S61). If the time difference is longer than the predetermined amount of time, the controller increments the count value of a counter (step S62). After that, the controller overwrites the current time in the memory (steps S63). If the time difference is not longer than the predetermined amount of time, the controller overwrites the current time in the memory (step S63). That is, the controller overwrites the current time in the memory regardless of whether the controller increments the count value of the counter or not.

The time can be acquired by referring to a clock in the wireless IC tag according to need. The configuration of the wireless IC tag can be the configuration as shown in FIG. 7. The time may be acquired from the data included in the interrogation wave that a wireless IC tag reader transmits.

The predetermined amount of time can be recorded in a memory of the wireless IC tag in the process of manufacturing the wireless IC tag. The predetermined amount of time may be written by a wireless IC tag writer.

Although the count value of the counter is incremented, the count value can be decremented.

When a wireless IC tag reader fails to read from a wireless IC tag, it may try to read several times. The sixth embodiment is effective in the case that is wanted to treat several reading trial until success of reading as one-time reading. If the time difference is not longer than the predetermined amount of time, the reading is treated as the reading trial and count-up is not carried out.

Seventh Embodiment

Figure 14:
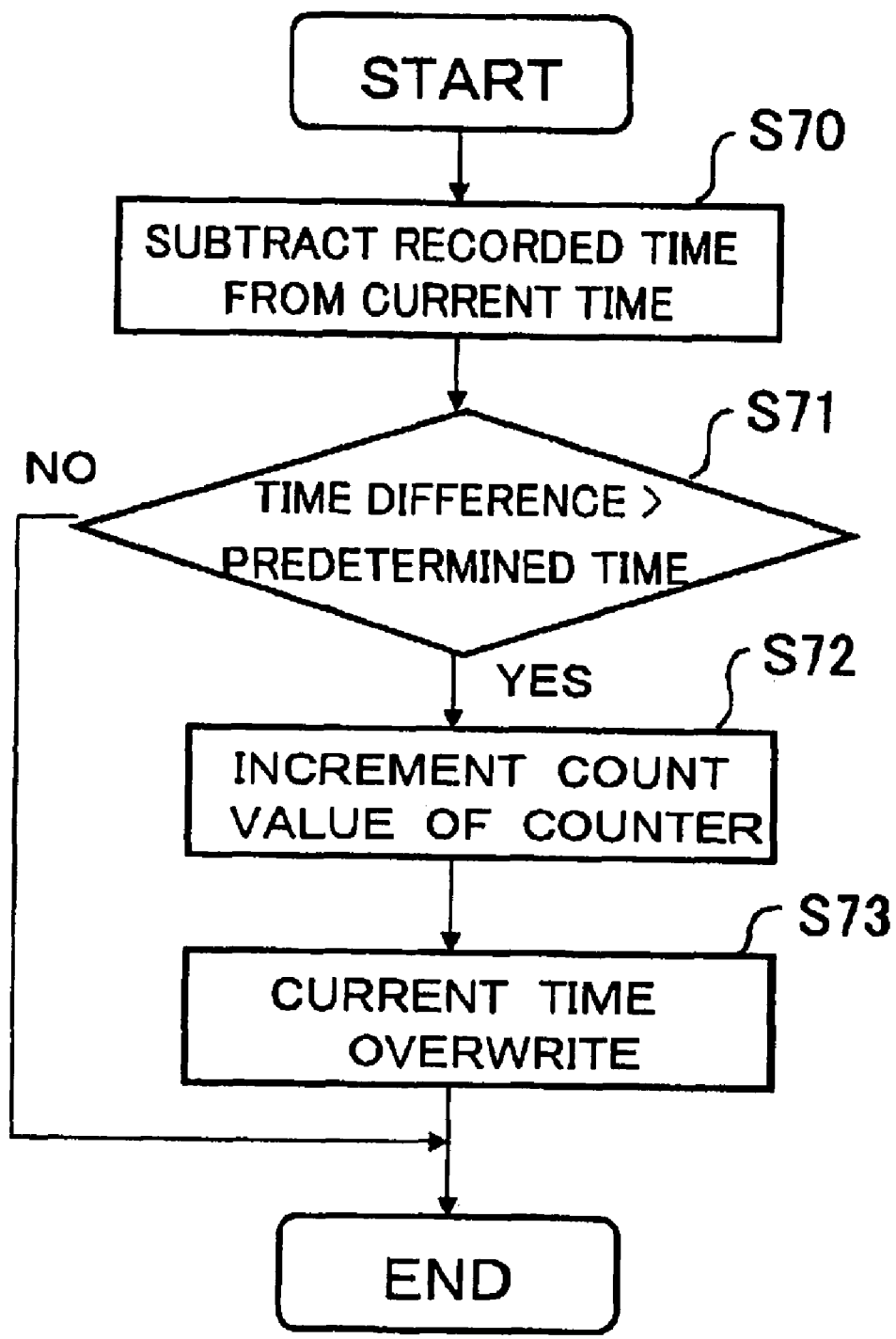
FIG. 14 is a flowchart showing operations of the wireless IC tag of the seventh embodiment of the invention.

FIG. 14 is a flowchart showing operations of the wireless IC tag of the seventh embodiment of the invention.

As shown in FIG. 14, when a controller receives a signal, the controller subtracts the time recorded in a memory from current time and determines whether time difference is longer than a predetermined amount of time or not (steps S70 and S71). If the time difference is longer than the predetermined amount of time, the controller increments the count value of a counter (step S72). After that, if the controller increments the count value of a counter, the controller overwrites the current time in the memory (steps S73). A method for acquiring time and a method for determining the predetermined amount of time can be same methods to the sixth embodiment.

Although the count value of the counter is incremented, the count value may be decremented.

In the seventh embodiment, if the time difference is not longer than the predetermined amount of time, the count of the count value and recording of the time are not carried out.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A wireless IC tag, comprising:
   an antenna; and
   a counter for counting on a basis of a signal received via said antenna,
   wherein said counter counts when the signal is received via said antenna, when a demodulation of the reception signal succeeds, when a demodulation and a decoding of the reception signal succeed, when the received signal is reorganized as a command, when a command of the received signal is received by said wireless IC tag, when a command of the received signal requires a response wave, or when a command of the received signal requires an ID of said wireless IC tag.

2. The wireless IC tag according to claim 1, further comprising a controller that sets an increment or a decrement of the count by said counter.

3. The wireless IC tag according to claim 2, wherein the increment or the decrement of the count is determined according to any one of an amount of reading-data from a memory, an amount of writing-data to the memory, and a data transmission amount.

4. The wireless IC tag according to claim 1, further comprising a clock,
   wherein a time of said clock is recorded for each counting by said counter.

5. An information management system comprising said wireless IC tag according to claim 1, and a wireless IC tag reader/writer for reading and writing information from and to said wireless IC tag.

6. A wireless IC tag, comprising:
   a memory for holding data; and
   a counter for each required data field of said memory or for at least one byte field of said memory,
   wherein said counter counts when data are read from or written to the data field or when data are read from or written to at least one byte field.

7. The wireless IC tag according to claim 6, further comprising a controller that sets an increment or a decrement of the count by said counter.

8. The wireless IC tag according to claim 7, wherein the increment or the decrement of the count is determined according to any one of an amount of reading-data from a memory, an amount of writing-data to the memory, and a data transmission amount.

9. The wireless IC tag according to claim 6, further comprising a clock,
   wherein a time of said clock is recorded for each counting by said counter.

10. An information management system, comprising:
said wireless IC tag according to claim 6; and
a wireless IC tag reader/writer for reading and writing information from and to said wireless IC tag.

11. A wireless IC tag, comprising:
a built-in power source; and
a counter for counting a number of actions periodically taken by said wireless IC tag,
wherein the actions comprise one of a transmission of information held in said wireless IC tag and where the actions include sensing operations of a built-in sensor.

12. The wireless IC tag according to claim 11, further comprising a controller that sets an increment or a decrement of the count by said counter.

13. The wireless IC tag according to claim 12, wherein the increment or the decrement of the count is determined according to any one of an amount of reading-data from a memory, an amount of writing-data to the memory, and a data transmission amount.

14. The wireless IC tag according to claim 11, further comprising a clock,
wherein a time of said clock is recorded for each counting by said counter.

15. An information management system, comprising:
said wireless IC tag according to claim 11; and
a wireless IC tag reader/writer for reading and writing information from and to said wireless IC tag.

16. A wireless IC tag, comprising:
an antenna;
a counter for counting on a basis of a signal received via said antenna; and
a memory that records time,
wherein, when the signal is received via the antenna, a time recorded in said memory is subtracted from a current time, and if a resulting time difference is longer than a predetermined amount of time, a count value of said counter is incremented or decremented.

17. The wireless IC tag according to claim 16,
wherein if the time difference is longer than the predetermined amount of time, the current time is overwritten in said memory.

18. The wireless IC tag according to claim 16, wherein if the time difference is longer than the predetermined amount of time, the current time is overwritten in said memory regardless of a passage of the predetermined amount of time.

* * * * *